E. B. HORN.
Vapor Burner.
No. 6,103.
Patented Feb. 6, 1849.
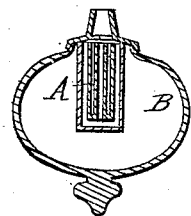
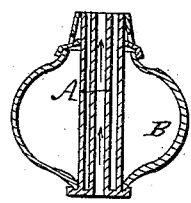
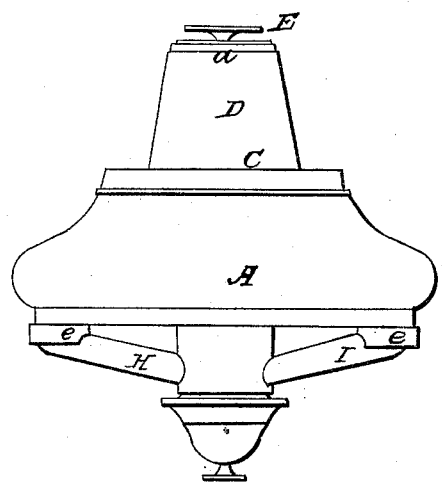
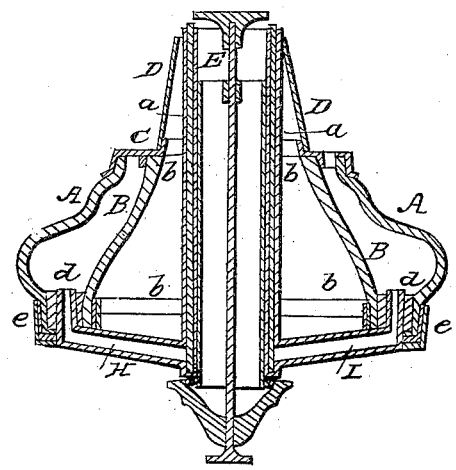

UNITED STATES PATENT OFFICE.

EDWIN B. HORN, OF BOSTON, MASSACHUSETTS.

CAMPHENE-LAMP.

Specification of Letters Patent No. 6,103, dated February 6, 1849.

*To all whom it may concern:*

Be it known that I, EDWIN B. HORN, of Boston, in the county of Suffolk and State of Massachusetts, have invented a new and useful Improvement in Argand Lamps for Burning Camphene or Purified Volatile Oil or Spirits of Turpentine; and I do hereby declare that the same is fully described and represented in the following specification and accompanying drawings, letters, figures, and references thereof.

Of the said drawings, Figure 1, denotes an external elevation, and Fig. 2, a transverse vertical section of one of my improved camphene lamps.

The object of my improvement is to procure for the lamp, two very important advantages, viz, that of a reduction of shadow peculiar to astral or other lamps, wherein the burner is made to extend through or into the fountain, also that of keeping or maintaining the camphene or volatile oil in the fountain, at or about at its ordinary atmospheric temperature, in order that all or nearly all that portion of it, which in camphene lamps, wherein the fountain is made of glass, and the burner is made to extend into or through it, and in direct contact with and through the fluid in it, is by heat transmitted through the burner usually evaporated through the top of the fountain and wasted, may be saved and burned with the remainder. It is well known that when camphene, or purified volatile spirits of turpentine, is elevated to a temperature but little above that of common summer heat, it readily evaporates. It therefore becomes of great importance to prevent in Argand lamps in which the fluid is used, the fountain from becoming heated by radiation of heat from the burner, that is by heat from the flame conducted by and through the metallic burner and thence imparted to the fluid surrounding and in contact with the burner. Experience has demonstrated that where the fluid is so heated, as much as fifty per cent. of it is often evaporated and lost, whereas were the fluid kept at the ordinary atmospheric temperature, all that so evaporated would have passed into and through the wick and been consumed by the flame. When the fluid is so evaporated the atmosphere surrounding the lamp becomes impregnated with it, and very offensive. Besides this the fluid often becomes so heated as to cause so rapid a volatilization as to produce an explosion of the lamp, which, scattering the heated fluid in various directions, causes serious consequences to ensue. My improved lamp is so perfect in its operation that not only does it permit the light to pass down through it, but it preserves the camphene so nearly at the temperature of the surrounding atmosphere as to prevent any loss by evaporation resulting from the cause above stated.

The lamp fountain I employ, is what may be termed a "ring shaped fountain," a vertical section of it being seen in Fig. 2, it being made of two curved concentric shells or sides A, B, made of translucent glass, the same being united together at bottom and supported at top, where they are connected to the metallic plate C, which supports the cone D, through which and between which and the outer tube $a$, of the burner E, the external current of air necessary to combustion passes. This fountain and the burner are made, and connected so as to have an air passage $b$, $b$, between them, and they are so connected with the cone D, by a cap plate C, as to cause all the air which passes upward through the passage $b$, $b$, to pass through the cone, and intercept and carry off the heat which may be radiated from the external sides of the burner. The said current of air, and the distance of the inner shell of the fountain from the burner, prevent the heat radiated from the burner from injuriously effecting the glass fountain.

The burner is connected with the fountain by two or any other suitable number of tubes H, I, each of which at one end, opens out of and extends from the outer tube of the burner, and at its other end it is turned upward and passed through a perforation, made through the bottom of a cement cup $d$, made to extend from the bottom part of, and to open into the fountain as seen in the drawings. The said cement cup is inserted in another metallic cement cup $e$, which is affixed to the conducting tube, and which previous to the insertion of the cup $d$, within it, is filled or partially filled with plaster cement. That end of the conducting tube which passes up through the cement cup $d$, is made to rise a little above the level of the bottom of the interior of the fountain, the same being to prevent the cement put in the cup d, from overflowing to the extent sufficient to pass into the conducting tube, as well as any sediment from the camphene, which at any time may lodge on the said bottom, from passing into the same.

The usual methods of making a chemical oil or camphene lamp, with a glass fountain are delineated in Figs. 3 and 4. In both of these methods it will be seen that the fountain B, was made a hollow or globular shaped vessel and had the burner A, extended into or through it, in such manner as to pass directly into the chemical oil in the fountain. It will be readily seen how easily the heat of the flame would be conducted by the metallic burner into the chemical oil, so as to elevate its temperature to a degree sufficient to rapidly vaporize it, and cause more or less of it to be dissipated through the air openings in the top of the fountain.

Therefore that which I claim as of my invention is—

The manner in which I construct the fountain in order to allow the rays of light, proceeding from the wick of the burner, to pass downward through both the internal and external concentric sides or shells of the fountain, that is to say, I claim an internal translucent side or shell in combination with an external concentric translucent side or shell, whether the said two concentric translucent sides of the said fountain, be connected together by a translucent or opaque bottom.

In testimony whereof I have hereto set my signature this eighth day of July A. D. 1848.

EDWIN B. HORN.

Witnesses:
R. H. EDDY,
BENJAMIN EDDY.